US012139289B2

(12) United States Patent
Brückner et al.

(10) Patent No.: US 12,139,289 B2
(45) **Date of Patent: *Nov. 12, 2024**

(54) SYSTEM AND METHOD FOR PRODUCING MEDICAL PACKAGING

(71) Applicant: Fresenius Kabi Deutschland GmbH, Bad Homburg (DE)

(72) Inventors: Thomas Brückner, Friedberg (DE); Benjamin Fritz, Friedberg (DE); Gerald Wegner, Friedberg (DE); Stefan Faber, Friedberg (DE); Alexander Stojmanovski, Friedberg (DE); Marko Krenzlin, Friedberg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 212 days.

This patent is subject to a terminal disclaimer.

(21) Appl. No.: 17/609,623

(22) PCT Filed: May 20, 2020

(86) PCT No.: PCT/EP2020/064129
§ 371 (c)(1),
(2) Date: Nov. 8, 2021

(87) PCT Pub. No.: WO2020/234385
PCT Pub. Date: Nov. 26, 2020

(65) Prior Publication Data

US 2022/0227520 A1 Jul. 21, 2022

(30) Foreign Application Priority Data

May 21, 2019 (EP) .................................... 19175636

(51) Int. Cl.
*B41J 2/325* (2006.01)
*B31B 70/88* (2017.01)
(Continued)

(52) U.S. Cl.
CPC ............ *B65B 61/025* (2013.01); *B31B 70/88* (2017.08); *B41F 16/0013* (2013.01);
(Continued)

(58) Field of Classification Search
CPC ... B65B 61/025; B31B 70/88; B41F 16/0013; B41F 19/00; B41J 2/325; B41J 3/546; B41M 3/008
See application file for complete search history.

(56) References Cited

U.S. PATENT DOCUMENTS 6,543,946 B2 4/2003 Hori et al.
9,283,770 B2 3/2016 Kirchner
(Continued)

FOREIGN PATENT DOCUMENTS

CL 202102919 5/2021
JP 2003231339 A 8/2003
(Continued)

*Primary Examiner* — Scott A Richmond
(74) *Attorney, Agent, or Firm* — Occhiuti & Rohlicek LLP

(57) ABSTRACT

The invention relates to a system and a method for manufacturing a medical package, in particular a foil bag made of plastic. A print image with variable information is first applied by means of a thermal transfer printer which is formed as a negative print image and comprises blank spaces. The blank spaces are filled by means of a hot stamp printing process.

22 Claims, 7 Drawing Sheets

(51) Int. Cl.

| | |
|---|---|
| ***B41F 16/00*** | (2006.01) |
| ***B41F 19/00*** | (2006.01) |
| ***B41J 3/01*** | (2006.01) |
| ***B41J 3/407*** | (2006.01) |
| ***B41J 3/54*** | (2006.01) |
| ***B65B 61/02*** | (2006.01) |

(52) U.S. Cl.
CPC ............. *B41F 19/007* (2013.01); *B41J 2/325* (2013.01); *B41J 3/01* (2013.01); *B41J 3/407* (2013.01); *B41J 3/546* (2013.01); *B65B 2220/20* (2013.01)

(56) References Cited

U.S. PATENT DOCUMENTS

| | | | | |
|---|---|---|---|---|
| 2003/0007821 | A1 | 1/2003 | Hori et al. | |
| 2004/0198858 | A1* | 10/2004 | Labrec ..................... | B41M 5/24 522/2 |
| 2011/0316696 | A1* | 12/2011 | Yao ....................... | G09F 3/0291 427/2.1 |
| 2015/0174913 | A1* | 6/2015 | Kirchner .................. | B41J 2/325 347/213 |
| 2022/0194073 | A1 | 6/2022 | Bruckner et al. | |
| 2022/0227520 | A1 | 7/2022 | Brückner et al. | |

FOREIGN PATENT DOCUMENTS

| | | | |
|---|---|---|---|
| JP | 4270793 | B2 | 6/2009 |
| JP | 2010241471 | A | 10/2010 |
| JP | 5387105 | B2 | 1/2014 |
| WO | 9949408 | A1 | 9/1999 |

* cited by examiner

SYSTEM AND METHOD FOR PRODUCING MEDICAL PACKAGING

CROSS-REFERENCE TO RELATED APPLICATIONS

This application is a national phase under 35 U.S.C. 371 of International Application No. PCT/EP2020/064129 filed on May 20, 2020, which claims priority to European Application No. 19175636.0 filed on May 21, 2019, the contents of all of which are hereby incorporated by reference in their entireties.

FIELD OF THE INVENTION

The invention relates to a system and a method for manufacturing a medical package. The invention further relates to a medical package manufactured therewith, in particular formed as a foil bag.

BACKGROUND OF THE INVENTION

Medical packages, such as for example foil bags, must be provided with a label which indicates for example the contents. To this end, the packages are generally printed.

Furthermore, medical packages are also often printed with machine-readable information, such as for example with a barcode which can be read by hospital personnel using a scanner. The contents of the medical package can be identified using the barcode.

It is known in practice to apply machine-readable information to medical foil bags in the form of a negative print image (see for example WO 99/49408 A1). A negative print image printed in white on a transparent foil is easily readable by a scanner because the transparent regions have only a low light reflection and thus appear virtually dark to the scanner. However, readable information in the form of such a negative print image can only be deciphered with difficulty by the human eye.

A dark, in particular black, print image on a transparent foil is in turn not machine-readable with sufficient ease since it does not form sufficient contrast with the adjoining transparent regions.

For this reason, there are approaches for first providing a white background on the medical package, for example in the form of a label or a printed area, and then impressing the black ink on the white background.

The print must, however, also be formed so as to be smudge-proof and in particular be suitable for also withstanding an autoclaving process. This also applies in particular to foil bags which are often autoclaved in a tear-open secondary package, with the printed surface of the foil bag being in contact with the secondary package and it can therefore be easily smudged.

Furthermore, medical packages are generally first printed with static information, such as for example the product name and/or the contents. This fixed information does not change from batch to batch of the product.

Moreover, there is often also variable information on the medical package, such as for example batch number, serial number and/or expiry date which can change from batch to batch or even from package to package.

To apply such variable information, offline printing processes that work with a fixed stamp are less suitable since the stamp must be changed each time in order to change the print image.

To apply such variable information, online printing processes using a digitally controlled print head are appropriate since the print image can therefore be changed at any time using a control device.

Therefore, there are for example thermal transfer printers which transfer the color from an ink ribbon to the surface to be printed by means of a number of individually actuated heating elements.

Compared to offline printing processes operating using a stamp, thermal transfer printers are, however, rather slow. This is in particular disadvantageous if large regions of the medical package are supposed to be printed.

OBJECT OF THE INVENTION

The object underlying the invention is therefore to provide a system for manufacturing a medical package and a method for manufacturing a medical package and a medical package, in which variable information and static information can be efficiently and in particular permanently impressed on the medical package.

SUMMARY OF THE INVENTION

The object of the invention is already achieved by a system for manufacturing a medical package, by a method for manufacturing a medical package and by a medical package according to one of the independent claims.

Preferred embodiments and further developments of the invention can be inferred from the subject matter of the dependent claims, the description and the drawings.

The invention first relates to a system and a method for manufacturing a medical package, which comprises printing a foil, having a first printer, which comprises a digitally controlled thermal print head with a number of heating elements, which can be actuated via a control device and by means of which a variable print image can be generated on a surface of the medical package and a second printer arranged downstream which is formed as a hot stamp printer, which comprises a printing plate which comprises a print relief with a flat section, with the flat section being dimensioned and arranged in such manner that it overlaps at least in sections with the print image generated by the first printer.

The knowledge underlying the invention is that in particular a negative print image can be efficiently applied on the surface of a medical package, in particular on a foil, via a digitally controlled thermal print head, which serves as the template for the following hot stamp printing.

The blank spaces in the negative print image are then filled with the ink of the hot stamp printer arranged downstream. The flat region of the hot stamp printer overlaps here with the negative print image in such manner that the regions not printed by the first printer, i.e. the blank spaces, are printed with ink of the second printer. The ink of the hot stamp printer adheres only in the regions where the first printer with the digitally controlled thermal print head has not generated a print image on the surface, in particular in the blank spaces of the negative print image.

It is thus possible to apply, by means of the digitally controlled thermal print head, a preferably variable print image on a surface region, which occupies only a part of the printed area. Other information, in particular static information, such as for example the product name, etc., can be applied simultaneously, in particular in another region of the surface of the medical package.

This print image can for example contain machine-readable information applied inversely and as a result represents a negative print image. Thus, the blank spaces of the negative print image of the first printer are filled with the ink of the hot stamp printer.

The result is preferably a dual-color, for example black and white print image in which the inks adjoin one another directly without overlapping and without there being gaps between the individual colors.

Thus, it is possible in a particularly efficient manner to provide a part of the medical package with a, for example, black and white print image, which comprises both machine-readable information and information readable by the user of the medical package. In particular, variable information is present in a black and white print image, with the variable information being arranged inside the region which occupies the flat section during printing.

According to one embodiment of the invention, in the second printer, the flat section of the print relief is dimensioned and arranged in such manner that it lies inside the print image generated by the first printer. The flat region can be formed in particular as a rectangle.

Since the flat region preferably lies completely inside the printed region of the print image generated by the first printer, only the blank spaces of the print image generated by the first printer are printed with the ink of the second printer, without the flat region protruding over the print image generated by the first printer. The ink of the flat region is thus transferred only inside the print image of the first printer.

The flat region is preferably a region in which the relief, i.e. the protruding region of the printing plate, occupies the entire area.

According to a further embodiment of the invention, the print relief of the printing plate comprises at least one further section, with the further section containing a structure with static information and being dimensioned and arranged in such manner that it lies outside of the print image generated by the first printer.

Therefore, as described above, only a partial region on the package is provided with the negative print image of the first printer. This preferably serves to provide variable information. In contrast, a further region, in particular a larger region than the region of the first print image, which contains only static information, can be printed via the printing plate.

The further section of the print relief can have at least a structure selected from a group consisting of letters, digits, symbol, image, barcode and data matrix code.

The variable and/or static information can comprise information that can be visually read by the user and machine-readable information.

The first printer and the second printer are preferably arranged one behind the other in such manner that a foil tape can be transported along the printers.

According to one embodiment of the invention, the system also comprises a filling station to fill the medical package with a medical liquid and a device to seal the filled medical package.

Furthermore, the system can comprise an autoclaving station in which the medical packages manufactured with the system are sterilized.

The medical package manufactured with the system is formed in particular as a foil bag which comprises printed foils welded together.

The foil is preferably first printed by means of the system and then welded to form a bag.

The system can be used to manufacture a medical package made of plastic, in particular a foil bag, in particular a medical package, as described below.

Furthermore, the invention generally relates to a method for manufacturing a medical package made of plastic, which comprises printing a foil, in particular for a foil bag, and which is preferably carried out with the previously described system.

The invention is described in detail by a method for manufacturing a medical package, with a negative print image first being applied on a surface of a foil, in particular of the medical package, with a first printer in the digital printing process, with at least one section of a print image being defined by blank spaces in the negative print image and with a printing plate with a print relief then being impressed at least in sections flatly on the negative print image in a second printer and the blank spaces of the negative print image being printed with an ink of the color foil.

As already discussed in connection with the system according to the invention, the knowledge underlying the invention is that the print image generated by the first printer can be used as a template for a subsequent offline printing process, in which a print relief is used, which comprises a flat section, and a color foil is in sections flatly impressed on the negative print image so that the blank spaces are printed, in particular filled, with the ink of the color foil.

A printer with a digitally controlled thermal print head with a number of heating elements is preferably used as the first printer to apply the negative print image.

It is preferably connected to a control device, via which the negative print image can be variably changed, for example from batch to batch or from print to print.

The first printer is preferably formed as a thermal transfer printer.

According to one embodiment of the invention, a first ink can be applied on the foil, in particular on the medical package, with the first printer to achieve the negative print image. Therefore, an ink in the form of a negative image of the print of the second printer can be applied with the first printer.

Furthermore, according to another embodiment of the invention, the first printer or the thermal print head can also be used only to heat the surface in regions in order to thus generate a template for the print image of the flat section of the second printer. A print image is generated on the foil by means of the first printer, without an ink being applied. In this case, the print image with the variable information can be generated with the first printer, which comprises the digitally controlled thermal print head, without a color being applied by means of the digitally controlled thermal print head. Thus, only a negative image in the form of heating the surface of the medical package is carried out with the digitally controlled thermal print head.

It was found that the surface properties can already be changed by heating the plastic surface, preferably a polypropylene-based foil, in such manner that the ink of the hot stamp printing does not adhere in the regions of the print image generated with the thermal print head during the subsequent hot stamp printing.

The thermal print head is thus used only to generate a negative template for the subsequent hot stamp printing process, in which a printing plate is impressed on the surface of the package.

This embodiment of the invention is suitable in particular if only a single-colored print image is necessary. Even in the case of this embodiment of the invention, a region of the surface of the medical package can be very effectively provided with variable information which is smaller than the print image of the hot stamp printing.

A polypropylene-based foil, in particular a multi-layered polypropylene-based foil, can be used for the medical package.

The plastic of the medical package, in particular the plastic of the surface of the medical package to be printed, comprises a matrix phase-polymer system according to one embodiment of the invention.

In particular, the matrix polymer of the matrix polymer system comprises propylene. In particular, the phase polymer of the matrix phase-polymer system is a styrene-ethylene-butylene-styrene block copolymer (SEBS) and, if necessary, a styrene-isoprene-styrene block polymer (SIS). The matrix preferably consists of polypropylene.

Tear-proof foils, which are also easily weldable, can be provided with such a matrix phase system.

In the case of a matrix phase-polymer system, at least two different polymers are present, with one polymer being present in a segregated manner, in particular as disperse distributed hardened drops, in the matrix of the other polymer.

The styrene-ethylene-butylene-styrene block copolymer is a block polymer composed of styrene and butylene and ethylene parts, which comprises a hydrated butadiene part, to which styrene groups adjoin. This is produced in particular by polymerizing a styrene and butadiene monomer and then hydrating the previously polymerized styrene and butadiene polymer. The hydrated butadiene forms a soft middle block between styrene blocks.

It has been found that, in particular in the case of a matrix phase-polymer system, the surface is changed by a heat treatment, in particular with a thermal transfer printer, in such manner that, in the case of suitable temperature control of a subsequent hot stamp printing process, the ink does not adhere in the thermally pre-treated regions.

In one embodiment, the multi-layered foil has at least three, preferably exactly three, layers. The layers are materially bonded to one another. In particular, the layers are connected to one another by co-extruding and joining in the hot state.

The multi-layered foil comprises at least one inner layer made of a matrix phase-polymer system, a middle layer made of a matrix phase-polymer system and an outer layer made of a matrix phase-polymer system. The inner layer is in contact with the medical liquid. The outer layer provides the surface of the medical package formed an infusion bag and thus the print region.

According to one embodiment, the matrix polymer of the outer layer is a polypropylene homopolymer. This achieves a fixed outer layer of the layer packet. In particular, in the outer layer, the weight proportion of the matrix polymer is in a range of 75-95% by weight and the weight proportion of the phase polymer, preferably SEBS, is in a range of 5-25% by weight.

According to a further embodiment, the matrix polymer of the middle layer is a PP random copolymer. In particular, in the middle layer, the weight proportion of the matrix polymer is in a range of 40-65% by weight and the weight proportion of the phase polymer, preferably SEBS and SIS, is in a range of 35-60% by weight.

According to a further embodiment, the matrix polymer of the inner layer is a PP random copolymer. In particular, in the inner layer, the weight proportion of the matrix polymer is in a range of 70-90% by weight and the weight proportion of the phase polymer, preferably SEBS, is in a range of 10-30% by weight.

The first ink comprises white pigments in the case of one embodiment of the invention. It is preferably transferred from an ink ribbon, in particular from a polyester ink ribbon, to the package.

According to one embodiment of the invention, the first ink comprises a polyacrylate and a polyolefin.

Such inks comprising a polyacrylate and a polyolefin are also referred to as resin-based inks and, unlike inks with a high wax proportion, enable smudge-proof printing which is also thermally resistant and in particular withstands an autoclaving cycle. Autoclaving typically takes place at a temperature of 121° C.

According to a preferred embodiment of the invention, the surface of the medical package is heated with the first printer to above 130° C., preferably above 140° C. and/or below 200° C., preferably below 190° C. in the negative print image outside of the blank spaces.

The previously described temperature range is suitable in particular for applying acrylate-based inks which are in particular transferred from a color foil and which are also sufficiently temperature-resistant to withstand an autoclaving cycle.

Preferably, a surface of the foil or of the medical package is printed with the ink of the impressed foil with at least one item of information outside of the negative print image applied with the first printer.

Static information is in particular applied outside of the print image of the first printer. This can, as previously described, comprise information readable by humans and machine-readable information.

The ink of the impressed color foil is in particular applied by means of a hot stamp printing process, with the printing plate used preferably comprising a flat section which lies inside the negative print image applied with the first printer and is impressed on the surface to be printed, with the printing plate comprising at least one further section on which preferably static information is impressed outside of the negative print image applied with the first printer.

In this way, a large region can be printed quickly and efficiently with the second printer, in particular with the hot stamp printer, whereas the negative print image, which occupies a smaller region than the printing plate, serves to apply variable information.

The flat section of the printing plate is preferably smaller than the negative print image. Thus, overlaps at the edges are avoided.

The variable information applied with the first printer can in particular comprise a serial number, a batch number and/or an expiry date.

Static information, such as for example a product name and/or machine-readable information, for example in the form of barcode and/or a data matrix code, can be applied with the second printer.

According to one embodiment of the invention, a print containing machine-readable information and information with text and/or digits is applied by the second printer.

The ink of the impressed color foil preferably comprises black pigments and a resin.

A polyacrylate-containing color is preferably used for the ink of the impressed foil which is in particular transferred from an ink ribbon to the surface of the package.

In the case of one embodiment of the invention, the ink of the impressed color foil comprises a coating resin. In particular, the ink comprises a vinyl chloride-vinyl acetate copolymer and/or a vinyl chloride-vinyl acetate-maleic acid terpolymer.

The mentioned polymers, in particular a combination of the mentioned polymers, also enables a coating resin-based ink to be provided which can be applied via a hot stamp printing process and which has a high smudge resistance and a high thermal resistance. Furthermore, the colored layer of this ink adheres neither on the colored layer transferred with the first printer nor on the region of the surface of the medical package made of plastic that was heated with the first printer.

Furthermore, the ink of the impressed color foil can comprise a plasticizer, in particular p-toluene sulfonamide.

The invention further relates to a medical package which is manufactured with the previously described method and/or which is manufactured by means of the previously described system.

In particular, the medical package comprises features which are disclosed in connection with the previously described system and/or the previously described method, insofar as these relate to the medical package as such.

The medical package is in particular formed as a foil bag which comprises printed foils welded together.

Preferably, the foil is first printed with the previously described system and/or with the previously described method and then welded to form a bag.

The medical package is in particular constructed from foils welded together and has at least one weld seam, preferably at least one longitudinal and at least one transverse weld seam along which two foils are welded together. In particular, the medical package comprises two longitudinal and two transverse weld seams.

Furthermore, the medical package can also comprise at least one port for withdrawing a medical liquid. The port is in particular welded with its lower part in the weld seam or in one of the weld seams, in particular in a transverse weld seam. The lower part of the port can for example be configured in the form of a shuttle. The port can be part of a connector in which a septum is in particular arranged. For example, a needle, a spike, a Luer or a Luer Lock connector can be connected to the connector.

Furthermore, the medical package can also comprise a hanger for attaching it to a rack or an infusion stand. The hanger can in particular be formed as a recess or indent in a transverse weld seam opposite the port.

The package according to the invention can be filled with a medical liquid. The package preferably comprises a capacity of 50 to 1000 ml.

The medical liquid is a liquid which is used for medical purposes and is preferably administered intravenously. In a preferred embodiment, the medical liquid is an infusion solution. Possible examples of such infusion solutions comprise

- sterile water;
- saline solutions, in particular solutions with NaCl, KCl, CaCl and/or Mg;
- solutions with carbohydrates, in particular glucose solutions;
- solutions, emulsions and/or suspensions with nutrients for parenteral nutrition, in particular with lipids, aminoacids and/or glucose;
- colloid solutions, in particular for blood replacement therapy (e.g Voluven®); and/or
- what are known as pre-mixed systems where an active ingredient is already added to the medical liquid.

The medical package is in particular characterized in that it contains at least in regions a negative print image by way of which a print image of the second printer, i.e. a positive image, is defined.

The ink of the second printer in this case reaches precisely to the border of the negative print image without overlapping. In particular, the ink of the second printer reaches to the border of the negative print image without a gap or break without ink being present between the negative print image and the positive print image.

In the region of the negative print image, an ink preventing adhesion of the ink of the second printer is impressed either by means of the first printer. The inks also adjoin one another directly in the case of a foil without a gap or a colorless break being located therebetween.

According to another embodiment, the negative print image adjoining the positive print image is characterized by a thermal change in the surface, by way of which a template is formed inside of which the positive print image is located.

The invention in particular relates to a medical package which comprises a first print region with a negative print image impressed in the thermal transfer printing process, with blank spaces in the negative print image, by way of which at least one section of a print image is defined, being filled with an ink applied in the hot stamping process.

In particular, the negative print image applied in the thermal transfer printing process is provided by a first ink, with the first ink and the ink applied as the second ink in the hot stamp printing process adjoining one another directly.

In this case, the first ink preferably adjoins the second ink in such manner without there being a gap or colorless break and/or overlap between the first ink and the second ink.

Variable and/or static information is preferably provided by the ink filled into the blank spaces of the negative print image.

The invention in particular enables a print region in which static and variable information adjoin one another in a common print region in which the two inks are present.

According to one embodiment of the invention, the medical package comprises a second print region which is printed with the ink applied in the hot stamping process, with the second print region being arranged separate from the first print region on the package and with static information being applied in the second print region.

A separate arrangement of the second print region is understood as a region being located between the first and the second print region which has been printed neither with the first nor with the second printer. This region is for example formed as an unprinted region of the transparent foil.

The provision of such a region in which only static information is present enables quick and efficient printing to be carried out, for example with a fixed print relief.

In the case of one embodiment of the invention, the first and/or the second ink forms a 3 to 8 μm thick layer.

The first ink preferably forms a thinner layer than the second ink, in particular a layer at least 1 μm thinner.

According to one embodiment of the invention, the medical package is arranged in a secondary package. In particular, the medical package is arranged in a sterile manner in a secondary package, for example in a tear-open bag.

Owing to the configuration according to the invention, it is possible to sterilize, in particular to autoclave, the medical package arranged in the secondary package without the first and/or second ink adhering to the secondary package.

BRIEF DESCRIPTION OF THE DRAWINGS

The subject matter of the invention will be explained in more detail below with reference to the drawings FIG. 1 to FIG. 7.

DETAILED DESCRIPTION OF THE DRAWINGS

Figure 1:
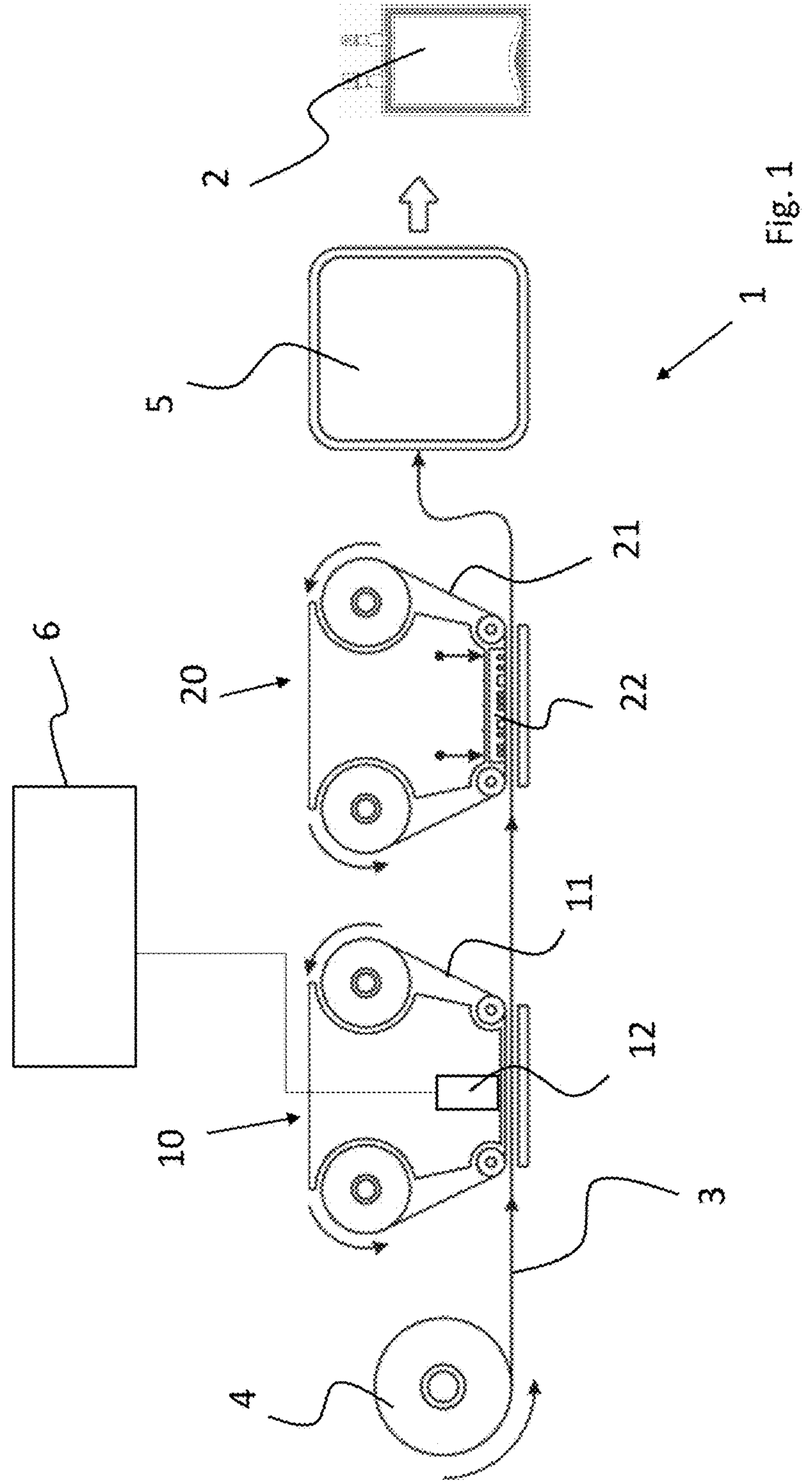
FIG. 1 is a schematic view of a system for manufacturing a medical package.

FIG. 1 is a schematic view of a system 1 for manufacturing a medical package 2.

Using the system 1, a foil 3, which is provided by a tape 4, is printed with a first printer 10 and a second printer 20.

The first printer 10 and the second printer 20 are arranged one behind the other such that the foil 3 can be guided successively along the two printers 10, 20.

The first printer 10 is formed as a thermal transfer printer. The thermal transfer printer 10 comprises a digitally controllable thermal print head 12 which is actuated by a control device 6. The thermal print head 12 transfers the ink 11*b* of a color foil 11 to the foil 3. Thus, a variable print image can be applied by, for example, the thermal print head 12 printing a region of the foil 3 line by line. In this case, a negative print image is applied on the foil 3.

The color foil 11 can for example be provided as an ink ribbon which is unwound from a roll. The ink 11*b* of the color foil 11 can also be referred to here as the first ink 11*b*.

The second printer 20 is formed as a hot stamp printer. It comprises a printing plate 22 which is heated and impressed on the surface of the foil 3 to be printed. The ink 21*b* of a color foil 21 is transferred via the printing plate 22 on the foil 3. The ink 21*b* of the color foil 21 can also be referred to here as the second ink 21*b*.

The printing plate 22 comprises a print relief 24 (see FIG. 5) with a flat section 24*a* by way of which blank spaces 44 of the negative print image 40 are filled.

The printed foil 3 is then supplied to a station 5 for manufacturing a medical package 2 with a filling device and a sealing device.

The station 5 for manufacturing a medical package 2 in the form of a foil bag 30 comprises a welding tool for manufacturing the bag 30, a filling device for filling the bag and a sealing device for sealing the filled bag.

Possible other stations for manufacturing the medical package 2 include in particular a station for packaging into a secondary package and/or a station for preferably thermal sterilization.

As a result, a medical package 2 made from plastic and which is formed as a foil bag 30 in this embodiment, is provided with a first and a second ink, in particular with a black and white print.

Figure 2:
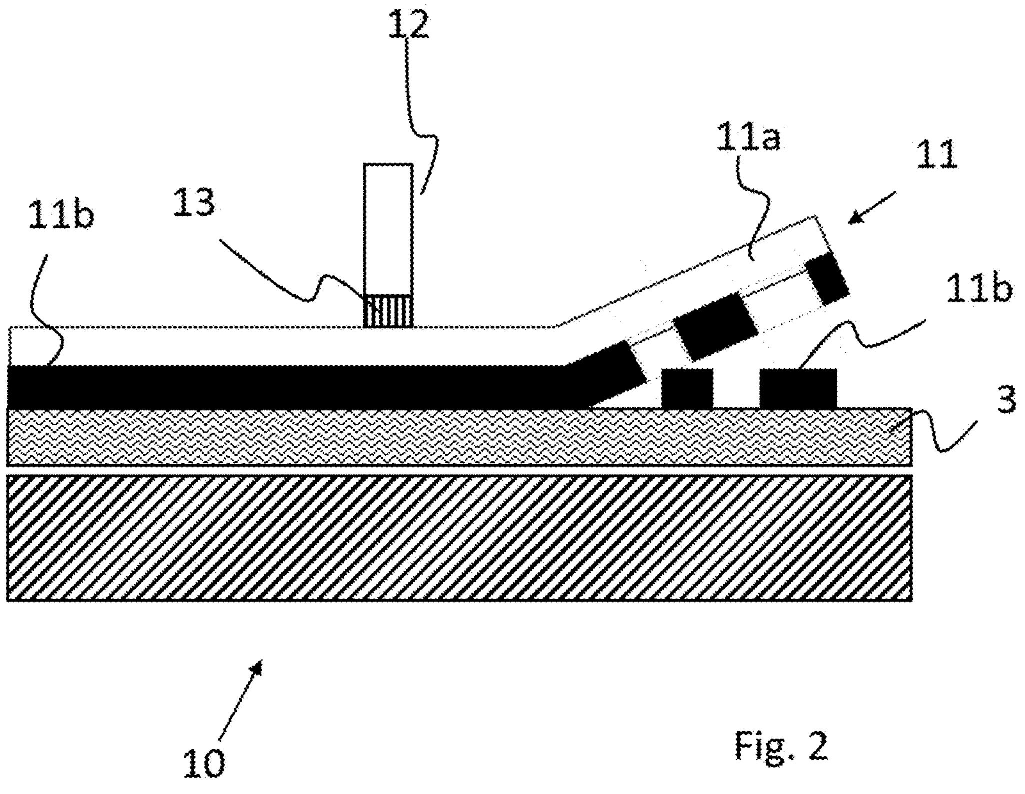
FIG. 2 is a schematic representation of a printing process by means of a thermal transfer printer.

FIG. 2 schematically shows the thermal transfer printer 10.

The thermal transfer printer 10 comprises the thermal print head 12, which is actuated by the control device 6 and comprises a number of heating elements 13 which can be individually actuated. As a result, a print image with variable information can be produced.

A color foil 11, in particular formed as an ink ribbon, with the support 11*a* and the colored layer 11*b* is moved relative to the thermal print head 12 and is heated in regions via the individually actuatable heating elements.

The ink of the colored layer 11*b* is liquefied in this way and is transferred to the foil 3 as the first ink 11*b*.

Thus, a print image, which in particular comprises pixels formed from the ink of the colored layer 11*b*, can be applied in a digitally controlled manner.

Figure 3:
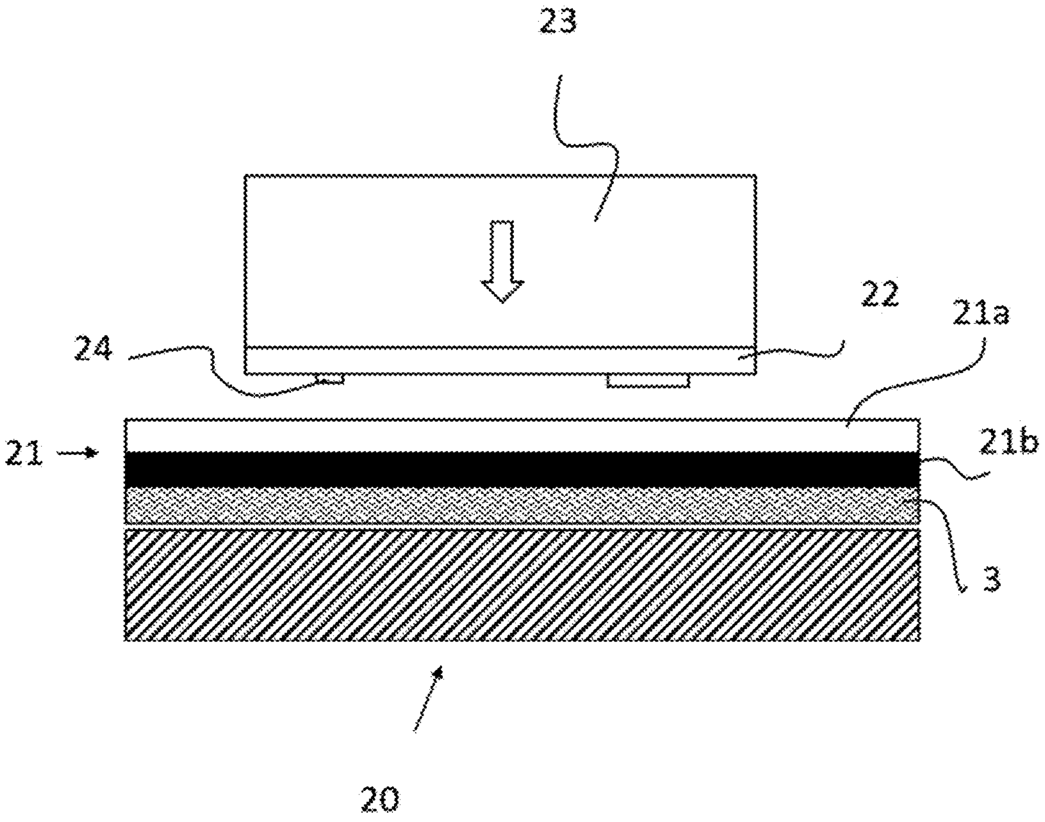
FIG. 3 is a schematic representation of a printing process by means of a hot stamp printer.

FIG. 3 is a schematic representation of the second printer 20, which is formed as a hot stamp printer.

The hot stamp printer 20 comprises a heatable support 23 to which a printing plate 22 is attached which comprises a print relief 24.

The printing plate 22 is impressed on the color foil 21 which comprises the support 21*a* and the colored layer 21*b*.

In the region of the protruding print relief 24, the ink of the colored layer 21*b* is heated and transferred under pressure and temperature as the second ink 21*b* from the color foil 21 to the foil 3.

Figure 4:
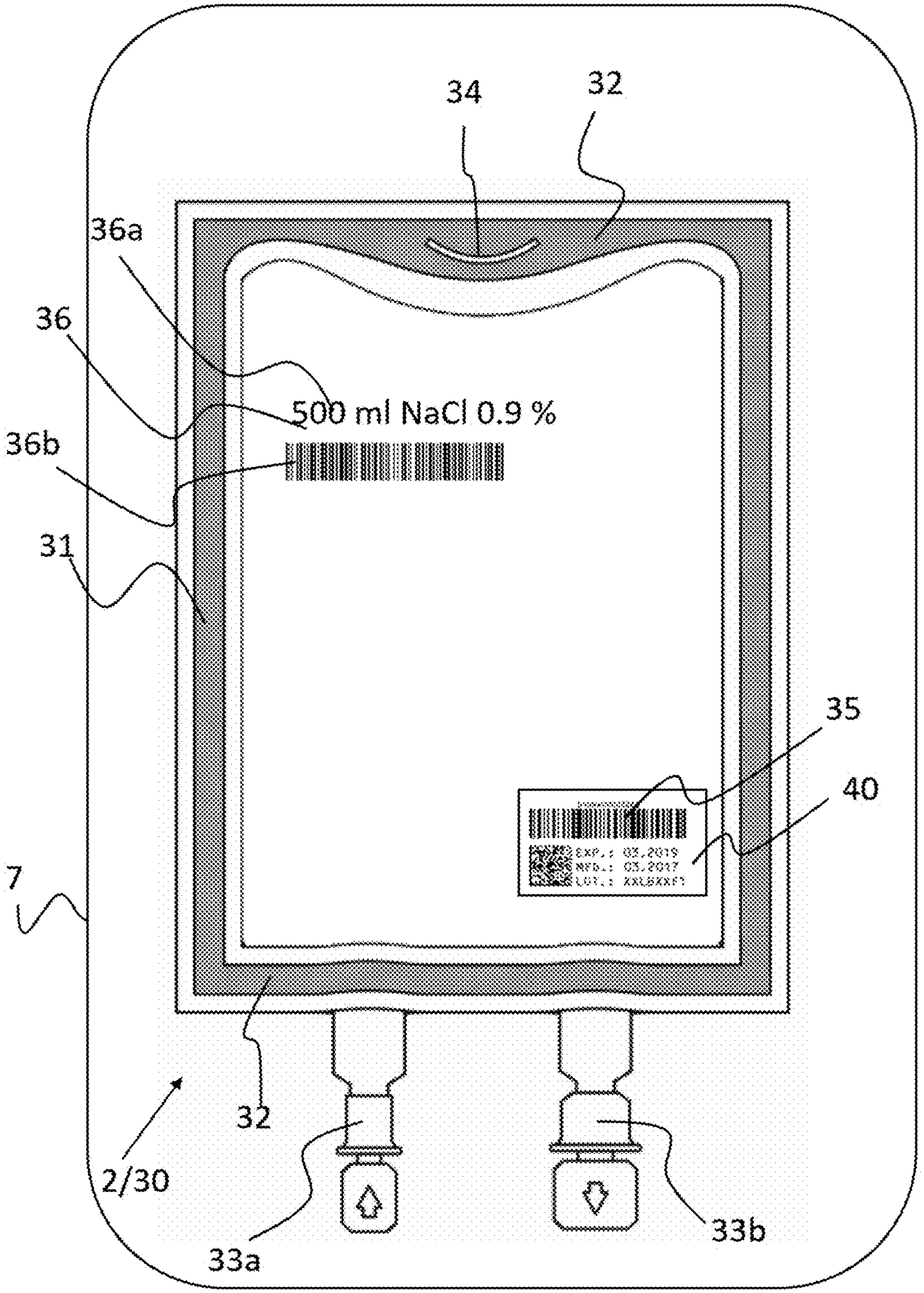
FIG. 4 is a view of an exemplary embodiment of a medical package.

FIG. 4 is a representation of an exemplary embodiment of a medical package 2 which is formed as a foil bag 30.

The medical package 2 or the foil bag 30 consists of foils 3 welded together at the transverse weld seams 32 and the longitudinal weld seams 31.

Furthermore, the foil bag 30 comprises connectors 33*a*, 33*b* via which liquid can be withdrawn and/or added.

The connectors 33*a*, 33*b* are welded into a transverse weld seam 32 in the case of this exemplary embodiment and comprise a break-off cap. After removing the break-off cap, a fluid connection can be established, for example by inserting a spike or a needle.

Furthermore, the foil bag 30 comprises a hanger 34.

The foil bag 30 is laid into a secondary package 7 in the example represented. The secondary package 7 is formed here as a tear-open bag and serves in particular as a barrier against oxygen.

In the case of manufacture, the foil bag 30 filled with the medical liquid is autoclaved in the secondary package 7 such that the content of the secondary package 7, in particular the entire foil bag 30, is sterile.

The foil bag 30 is printed.

The print image comprises a region 35 with variable information. The variable information can in particular comprise a serial number, a batch number and/or an expiry date.

Furthermore, the print image comprises a region with static information 36. The region with static information 36 comprises in this exemplary embodiment firstly a print image 36*a* visually readable by humans, i.e. for example a label with contents and/or the product name. Secondly, the region comprises machine-readable information, for example in the form of a barcode 36*b*. This can for example serve as machine-readable information regarding the content of the medical package 2.

Figure 5:
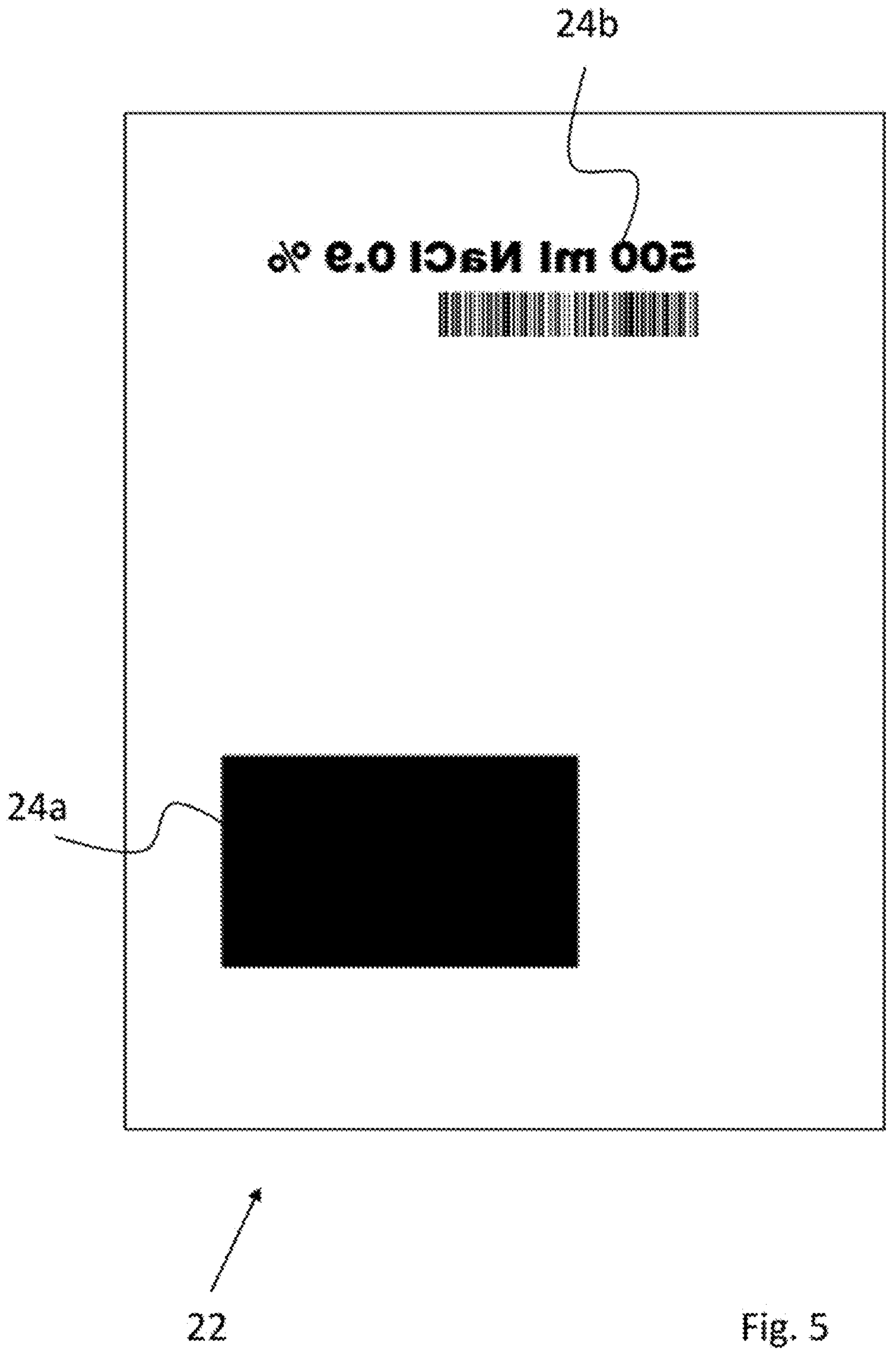
FIG. 5 is a view of the print relief used for the medical package.

The print regions of the print image with variable information 35 and of the printed region with static information 36, represented in black in FIG. 4, are applied with the second printer 20 after the region 35 with variable information has been printed beforehand by the first printer 10, with the printing plate 22 represented in FIG. 5 being used. The first printer 10 impresses the first ink 11*b*. The second printer 20 impresses the second ink 21*b*.

The printing plate 22 comprises a print relief 24, which comprises the flat section 24*a*, inside of which the second ink 21*b* serves to fill the blank spaces 44 of the print image 40 (see FIG. 6*a*-6*c*) of the first printer 10 which is provided by the first ink 11*b*.

In the further, non-flat section 24*b*, the print relief 24 comprises information readable by a human and/or by a machine. In this exemplary embodiment, the information comprises a label and a barcode. The visually readable information 36*a* and the barcode 36*b* represented in FIG. 4 are transferred on the foil 3 via the non-flat section 24*b* of the print relief 24.

Figure 6A:
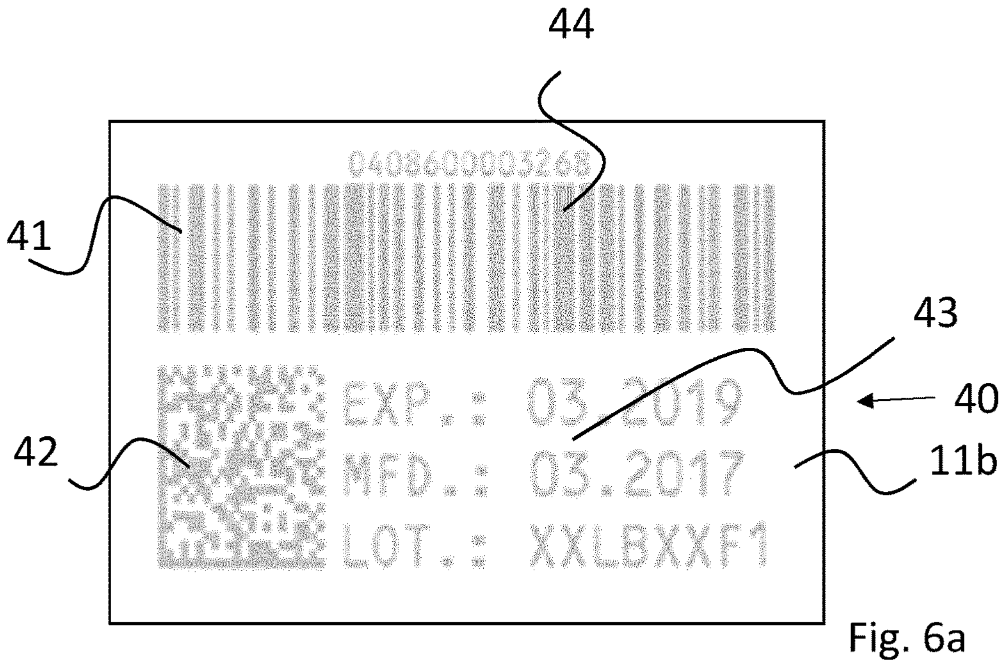
FIG. 6*a* to FIG. 6*c* show the steps via which a region is printed with a variable print image.
Figure 6B:
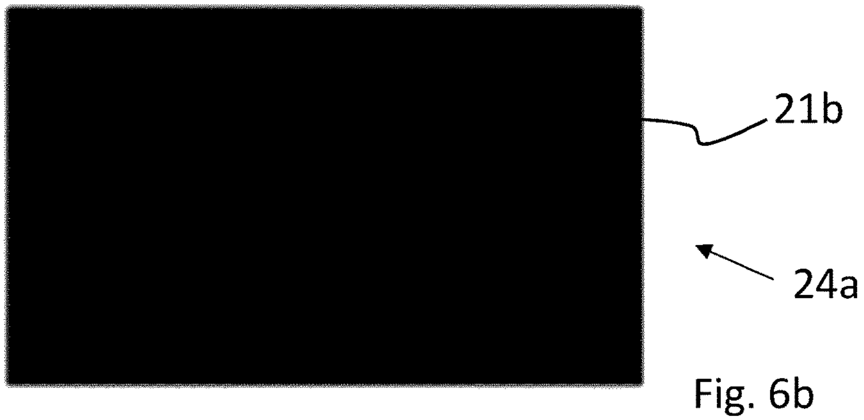
Figure 6C:
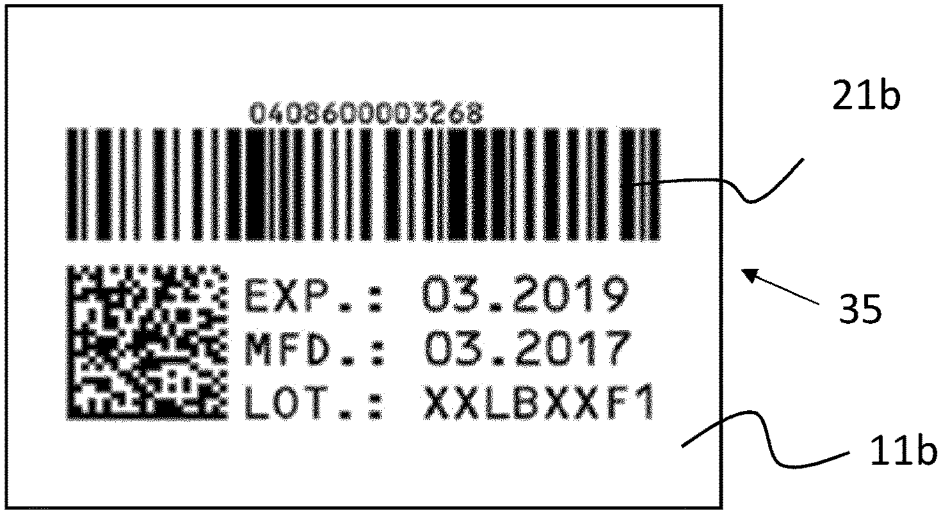

The steps in relation to printing the region 35 with variable information are represented in FIGS. 6*a* to 6*c*.

First, as represented in FIG. 6*a*, a print image 40 is applied by means of the first printer 10 which is formed as a thermal transfer printer. The print image 40 is a negative print image here which contains blank spaces 44. The blank spaces 44 of the print image 40 represent the actual information.

In this exemplary embodiment, the blank spaces 44 comprise a barcode 41, a data matrix code 42 and a label 43 containing for example an expiry date and/or a serial number.

This negative print image is formed by the first ink 11*b* of the color foil 11 of the first printer 10. The first ink 11*b* is in particular a white color.

The machine-readable information, i.e. e.g. the barcode 41 and/or the data matrix code 42, is readable via a scanner since the blank spaces 44 do not reflect light or only reflect a little light and appear dark to a scanner.

The label 43 is, however, difficult for the human eye to read.

Then, as represented in FIG. 6*b*, the foil 3 is printed by means of the second printer 20 formed as a hot stamp printer. In this process, the flat section 24*a* of the print relief 24 with the second ink 21*b* lies inside the print image 40 of the first printer 10 which has transferred the first ink 11*b*.

The blank spaces 44 of the print image 40 are filled with the second ink 21*b*. As represented in FIG. 6*c*, the print image 50 generated by the two printers 10, 20 now contains the print image 40 and the printed blank spaces 44 which are filled with the second ink 21*b* in the hot stamp printing.

At the same time, a further region 36 (see FIG. 4) is printed with static information in one step.

In the first print region 35 which is a combination of thermal transfer and hot stamp printing, a black and white print results which consists of a negative print image with white color of the first ink 11*b* whose blank spaces 44 are filled by the second black ink 21*b*.

The first print region 35 is smaller than the entire region of the print region of the second printer 20 and comprises variable, machine-readable information and variable, visually readable information. The first print region 35, in particular additionally, also contains static information.

Figure 7:
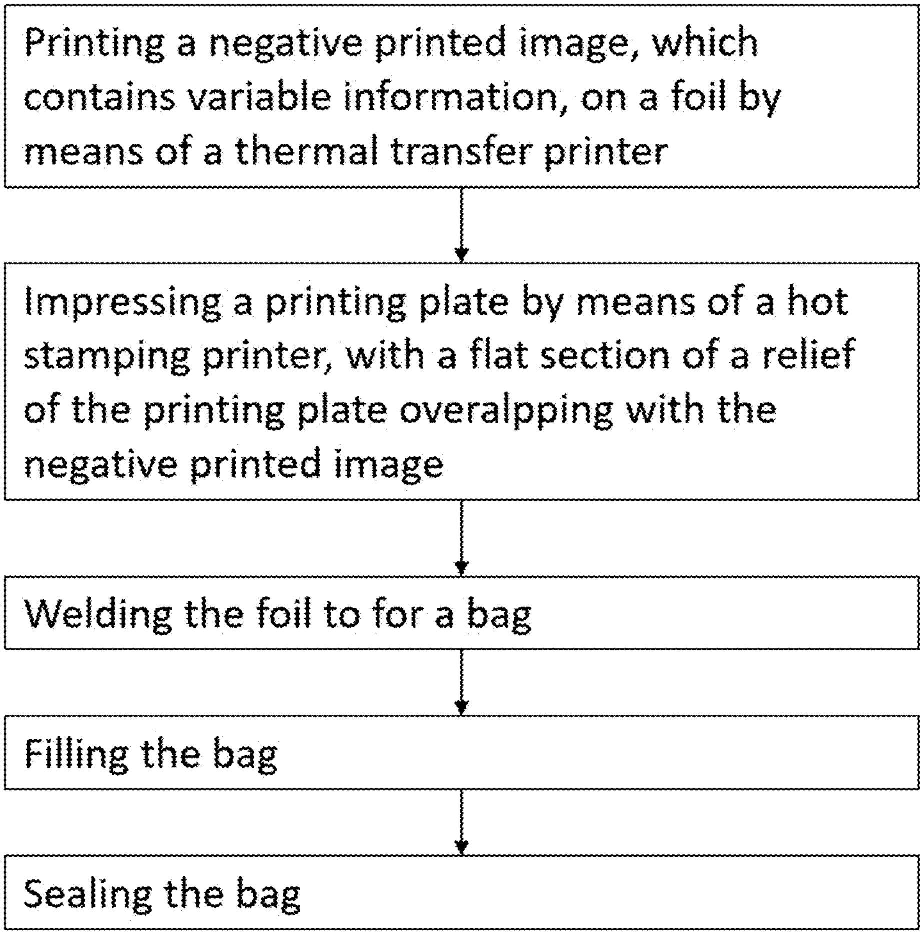
FIG. 7 is a flow diagram of the method steps according to an exemplary embodiment of the method according to the invention.

In FIG. 7, the method steps according to one exemplary embodiment of the invention are represented.

First, a negative print image 40, which contains at least variable information, is impressed on a foil 3 by means of a thermal transfer printer 10. The negative print image 40 is generated here by the first ink 11*b*.

Then, a printing plate 22 is impressed on the foil 3 by means of a hot stamp printer 20. A flat section 24*a* of the print relief 24 of the printing plate 22 overlaps with the negative print image 40. The blank spaces 44 of the negative print image 40 are filled with the second ink 21*b* of the hot stamp printer 20.

Then, the foil 3 is welded to form a foil bag 30, the foil bag 30 is filled and sealed. The sealed foil bag 30 is preferably then also enclosed in a secondary package 7 and the medical package 2 manufactured in this way is lastly autoclaved.

A method for manufacturing medical packages, in particular foil bags, is provided by the invention by means of which variable and static information can be, in particular simultaneously, applied in a very effective and accurate manner.

LIST OF REFERENCE NUMERALS

1 System for manufacturing a medical package
2 Medical package
3 Foil
4 Roll
5 Station for manufacturing the bag, together with filling station and station for sealing
6 Control device
7 Secondary package
10 First printer/thermal transfer printer
11 Color foil
11*a* Support
11*b* Colored layer/(first) ink
12 Thermal print head
13 Heating element
20 Second printer/hot stamp printer
21 Color foil
21*a* Support
21*b* Colored layer/(second) ink
22 Printing plate
23 Support
24 Print relief
24*a* Flat section
24*b* Non-flat section
30 Foil bag
31 Longitudinal weld seam
32 Transverse weld seam
33*a* Connector
33*b* Connector
34 Hanger
35 First print region/region with variable print image
36 Second print region/region with static print image
36*a* Visually readable print image
36*b* Machine-readable information/barcode
40 Negative print image/print image thermal transfer printer
41 Barcode
42 Data matrix code
43 Label
44 Blank space

The invention claimed is:

1. A system for manufacturing a medical package made of plastic, which comprises printing a foil, having a first printer, which comprises a digitally controlled thermal print head with a number of heating elements, which can be actuated via a control device and by means of which a variable print image can be generated on a surface of the medical package and a second printer arranged downstream which is formed as a hot stamp printer, which comprises a printing plate which comprises a print relief with a flat section, wherein the flat section is dimensioned and arranged in such manner that it overlaps at least in sections with the print image generated by the first printer.

2. The system according to claim 1, wherein the first printer and the second printer are arranged one behind the other such that a foil tape can be transported along the printers.

3. The system according to claim 1, wherein in the second printer the flat section of the print relief is dimensioned and arranged in such manner that it lies inside the print image generated with the first printer.

4. The system according to claim 1, wherein the print relief of the printing plate comprises at least one further section, wherein the further section contains a structure with static information and is dimensioned and arranged in such manner that it lies outside of the print image generated with the first printer, in particular wherein the further section of the print relief has at least one structure selected from a group consisting of letters, digits, symbol, image, barcode and data matrix code.

5. The system according to claim 1, further comprising a filling station for filling the medical package with a medical liquid and a device for sealing the filled medical package and, in particular, an autoclaving station.

6. A use of a system according to claim 1 for manufacturing a medical package made of plastic, in particular a foil bag.

7. A medical package, manufactured using a method and/or by means of a system according to claim 1.

8. The medical package made of plastic according to claim 7, comprising a first print region with a negative print image applied in the thermal transfer printing process, wherein blank spaces in the negative print image, by way of which at least one section of a print image is defined, are filled with an ink applied in the hot stamping process.

9. The medical package made of plastic according to claim 7, wherein the negative print image applied in the thermal transfer printing process is provided by a first ink, wherein the first ink and the ink applied as the second ink in the hot stamp printing process adjoin one another directly.

10. The medical package according to claim 1, wherein variable and/or static information is provided by the ink, which fills the blank spaces of the negative print image.

11. The medical package according to claim 1, comprising a second print region which is printed with the second ink applied in the hot stamping process, wherein the second print region is arranged separate from the first print region on the package and wherein static information is applied in the second print region.

12. The medical package according to claim 1, wherein the medical package is formed as a bag and/or in that the medical package is arranged in a secondary package, in particular formed as a tear-open bag.

13. A method for manufacturing a medical package made of plastic, which comprises printing a foil, in particular for a foil bag, preferably carried out with a system according to one of the preceding claims, wherein a negative print image is first applied on a surface of the foil, in particular of the medical package, with a first printer in the digital printing process, wherein at least one section of a print image is defined by blank spaces in the negative print image and wherein a printing plate with a print relief then impresses a color foil at least in sections flatly on the negative print image in a second printer and the blank spaces of the negative print image are printed with an ink of the color foil.

14. The method according to claim 13, wherein the first printer is provided to apply the negative print image with a digitally controlled thermal print head with a number of heating elements.

15. The method according to claim 14, wherein the negative print image is generated by impressing a first ink, in particular wherein the first ink comprises white pigments and is preferably transferred from an ink ribbon.

16. The method according to claim 13, wherein in a negative print image, outside of the blank spaces, a surface of the medical package is heated with the first printer to above 130° C., preferably above 140° C. and/or below 200° C., preferably below 190° C.

17. The method according to claim 13, wherein outside of a negative print image applied with the first printer, a surface of the medical package, in particular of the foil, is printed with the ink of the impressed color foil with at least one item of information.

18. The method according to claim 13, wherein the ink of the impressed color foil is applied by means of a hot stamp printing process.

19. The method according to claim 18, wherein the printing plate used in the hot stamp printing process comprises a flat section which is impressed on the surface to be printed inside of the negative print image applied with the first printer and wherein the printing plate comprises at least one further section via which static information is impressed outside of the negative print image applied with the first printer.

20. The method according to claim 13, wherein variable information, in particular a serial number, a batch number and/or an expiry date, is applied at least with the first printer and/or in that static information, in particular product name, a barcode and/or a data matrix code, is applied by the second printer.

21. The method according to claim 13, wherein black pigments and a resin are contained in the ink of the impressed color foil.

22. The method according to claim 13, wherein a foil is printed from which the medical package is manufactured.

* * * * *